Aug. 21, 1928.
H. C. SNOOK
1,681,376
SOUND RECORDING AND REPRODUCTION
Filed Sept. 22, 1922    3 Sheets-Sheet 1
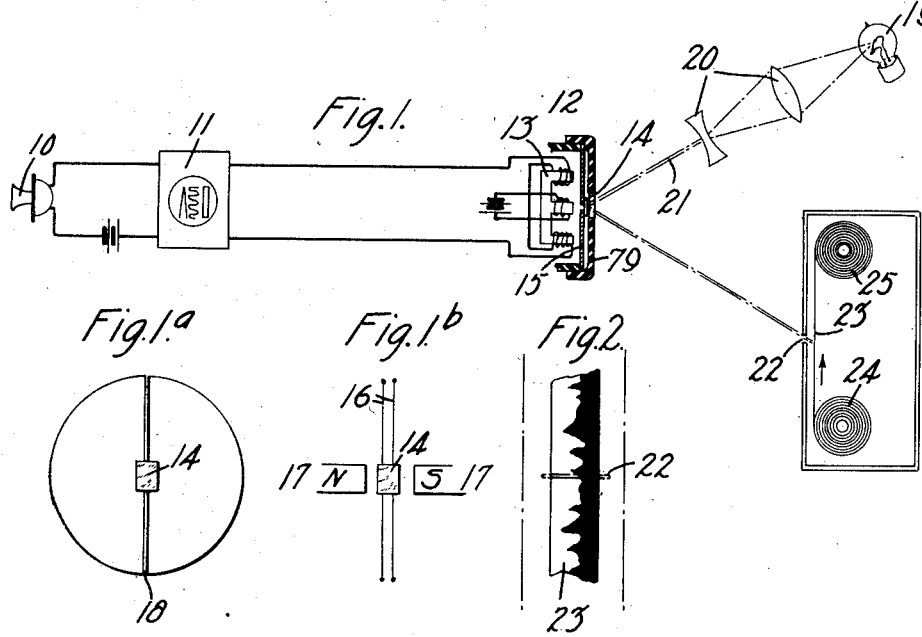
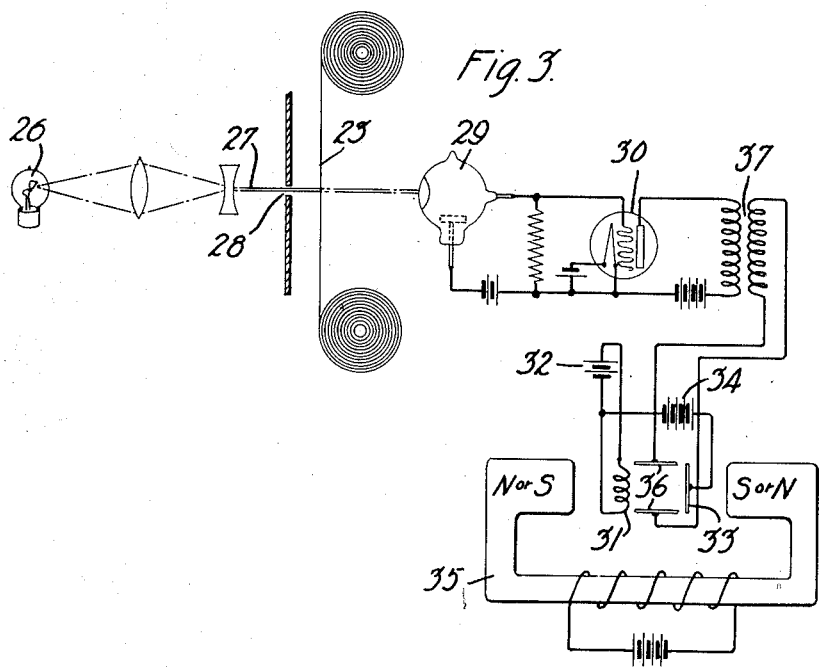
Inventor:
Homer C. Snook,
by E. V. Griggs
Atty.

Aug. 21, 1928.
H. C. SNOOK
1,681,376
SOUND RECORDING AND REPRODUCTION
Filed Sept. 22, 1922    3 Sheets-Sheet 2
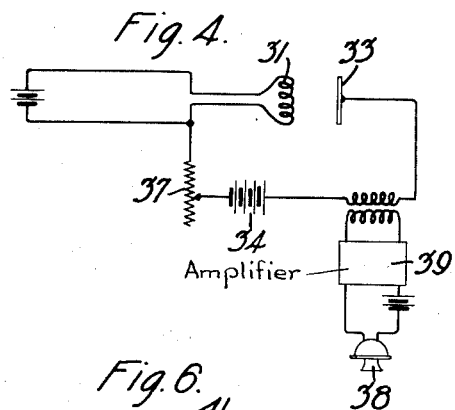
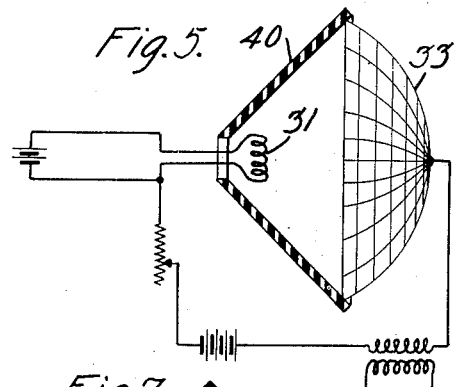
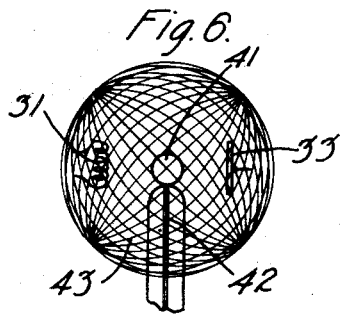
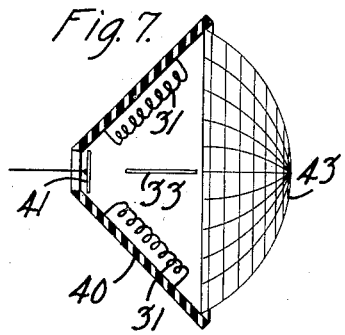
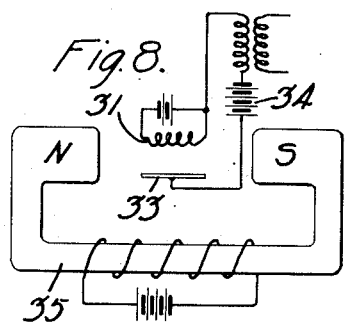
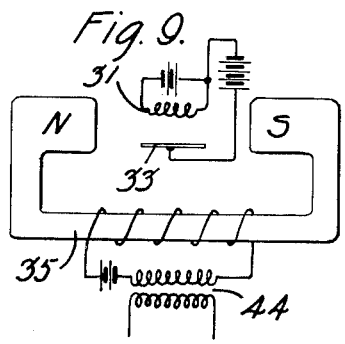
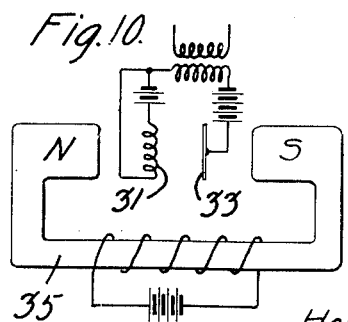
Inventor:
Homer C. Snook,
by W. Griggs
Atty.

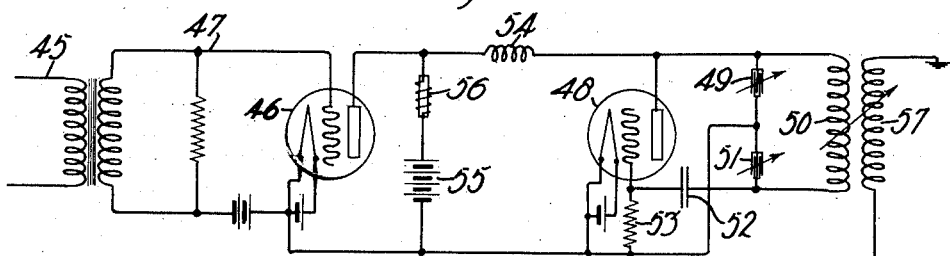
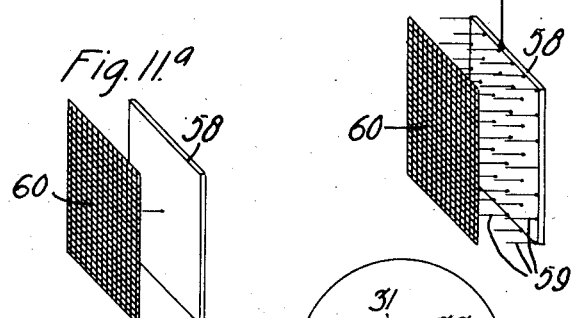
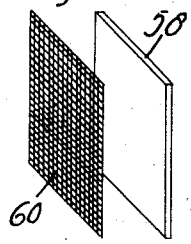
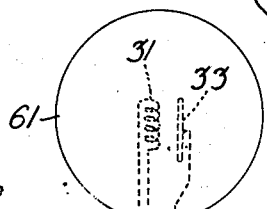
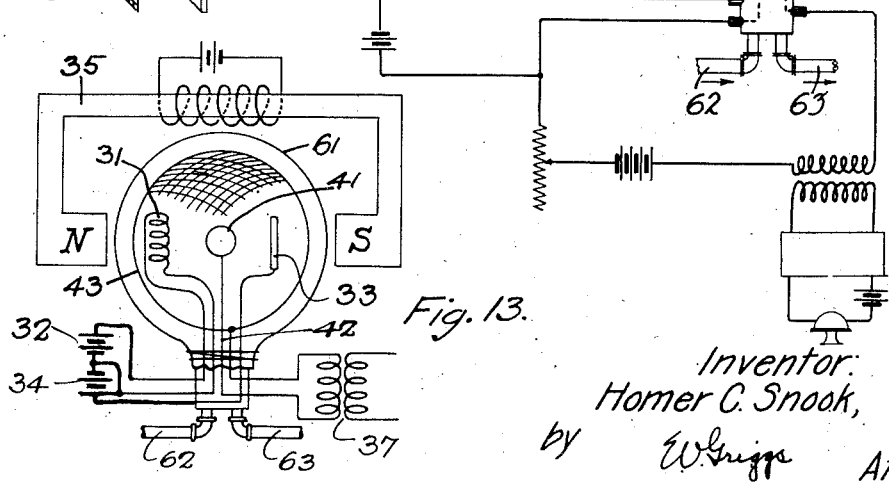

Patented Aug. 21, 1928.

1,681,376

UNITED STATES PATENT OFFICE.

HOMER C. SNOOK, OF SOUTH ORANGE, NEW JERSEY, ASSIGNOR TO WESTERN ELECTRIC COMPANY, INCORPORATED, OF NEW YORK, N. Y., A CORPORATION OF NEW YORK.

SOUND RECORDING AND REPRODUCTION.

Application filed September 22, 1922. Serial No. 589,813.

This invention relates to methods of distortionless recording and reproduction of sound and to systems operating in accordance with such methods.

An object of the invention is to provide means whereby sound waves may be recorded permanently in as nearly undistorted a condition as possible and whereby the record thus made may be used at any subsequent time to reproduce the original sound in any required volume.

A further object is to provide means whereby sound energy may be transmitted into the atmosphere by adding to the heat energy of a volume of the atmosphere, occupying a given space, in synchronism and in accordance with the frequencies and variations of the audible sounds to be reproduced.

Another object of the invention is to provide means whereby sound waves may be projected into a region of the atmosphere occupying any desired solid angle of which the apex is approximately at the sound source or whereby spherical radiation may be secured, if desired.

A complete system for carrying out the objects of the invention involves a distortionless thermionic amplifier for amplifying electrical waves produced by the sound to be recorded and a photographic recording device for recording variations which correspond to the sound waves. For reproducing the sound from the record thus made a beam of light is caused to vary in intensity in accordance with the recorded variations. The variable beam falls upon a distortionless photo-electric cell having no time lag and causes a current variation of small intensity but proportional to the illumination of the active element of the cell. This current variation is amplified in a suitable distortionless thermionic amplifier and impressed upon a distortionless loud speaking or other distortionless reproducer.

A special form of sound reproducer forms an important element of the invention. This may be used for reproducing sounds reproduced simultaneously with their production. It may also be used for reproducing recorded sounds. Hence, a further object of the invention is to improve sound reproduction by utilizing arrangements wherein the usual thin magnetic membrane or diaphragm for acting upon the atmosphere and setting it in vibration is not used. A volume of ionized air is substituted for the magnetic membrane.

In such a reproducing arrangement it is necessary to operate a thermionically active filament in an unevacuated space, hence the invention has for a further object to provide means whereby such a filament may be maintained electronically active in the open atmosphere or in a suitable space enclosed by a plastic membrance and filled with inert gas.

The invention is more particularly described in connection with the accompanying drawings wherein Fig. 1 is a schematic diagram of a recording system for recording sound waves on an elongated photographic strip or film; Figs. 1ª, 1ᵇ and Fig. 2 are details of the system of Fig. 1, Fig. 2 showing a portion of the record; Fig. 3 is a reproducing system whereby the sound record made with the arrangement of Fig. 1 may be used to reproduce speech or other sounds; Figs. 4, 5, 6, 7, 8, 9 and 10 are sound reproducing arrangements alternative to that disclosed as a part of Fig. 3; Fig. 11 is another modified sound reproducer which operates on the principle of first using the electrical waves representing the sound waves to modulate a high-frequency high-voltage current which is used to reproduce the sound by operating directly on the atmosphere; Figs. 11ª and 11ᵇ are modified forms of the elements of Fig. 11 which operate directly on the atmosphere; and Fig. 12 discloses a still further modified arrangement involving a principle which may be applied to any of the arrangements of Figs. 3 to 10 inclusive, in which a thermionically active filament is supplied and surrounded with a suitable inert gas. Fig. 13 shows the features of the reproducers shown in Figs. 3, 6, and 12, combined in a single device.

Referring more particularly to Fig. 1 the element 10 represents a distortionless input device such as an air damped microphone transmitter, an air damped electromagnetic transmitter or an air damped condenser transmitter. The element 11 represents a distortionless vacuum tube amplifier which receives the output from the distortionless input device 10 and transmits the amplified current variations which correspond to the received sound to distortionless translating device 12. The microphone 10 may be a special sensitive microphone such as described on page 8 of a bulletin published by the Western Electric Company, Incorporated, entitled "Public address systems," Bulletin T—672, dated June, 1922, a copy of which is deposited in the United States Patent Office Library. The distortionless amplifier 11 may consist of an amplifier such as described on page 10 of the same bulletin.

The elements 10 and 11 however, may be any equivalent distortionless devices and the invention is not limited to the use of those specified. If a condenser transmitter is employed it may be combined with an amplifier in the manner disclosed in U. S. patent to Fitch, No. 1,397,862, granted November 22, 1921.

The amplified waves from the amplifier 11 are caused to operate the translating device 12 which consists essentially of a small mirror 14 with means for actuating it in accordance with the electrical waves. In one arrangement, as shown, the current waves are caused to traverse windings of an electromagnet 13 arranged adjacent to the air damped diaphragm 15 after the fashion of an air damped electromagnetic receiver. The mirror 14 may be mounted on a bifilar suspension of the hot wire oscillograph type such as has been described by J. T. Irwin in the Proceedings of the Institute of Electrical Engineers (British) 1905 with the resultant advantages of high sensitivity inherent in this construction, but with certain limitations as to natural period, resonance, etc.

As another optional arrangement the mirror 14 may be mounted upon a structure after the manner disclosed in Patent 1,438,974 of December 19, 1922, to E. C. Wente, wherein two piezo-electric crystals are utilized to give the mirror angular movement. Reference is made to that application for a full description of this arrangement. These and other references are made herein with the specific intent that these disclosures shall constitute a portion of the present disclosure to the public.

A still further modified arrangement for actuating the mirror is disclosed in Fig. 1b, wherein the mirror 14 is mounted upon two fine wires 16 which extend parallel to each other and through which the current waves are caused to pass. The wires 16 extend transversely between the north and south poles 17 of a suitably designed electro-magnet of proper strength.

As a further modification the diaphragm 15 may have a saw cut across its diameter as shown at 18 in Fig. 1a. The mirror 14 is mounted upon the two halves of the diaphragm thus formed. The diaphragm 15 is understood to be air damped and for this purpose is arranged closely adjacent the casing or any other suitable member 79 in a manner well known to those skilled in the art.

A suitable source 19 preferably of monochromatic light is concentrated by a suitable lens system 20 into a parallel beam 21 and reflected by the mirror upon a narrow slit through which it passes to fall upon a film 23 which is sensitized with a suitable photographic emulsion. As the mirror is actuated in accordance with the sound waves, the beam of light is deflected so that a greater or less portion of it passes through the slit 22 to the film 23.

The motion of mirror 14 is such as to cause the reflected beam of light to move transversely with respect to the direction of longitudinal movement of the strip of photographic emulsion and to move in such manner that the beam of light as a brush will cover only one half of the width of the strip when the light beam is stationary, whereas, when in transverse motion, the light beam will cover more or less of the width of the photographic emulsion by an amount proportional to the momentary current supplied to the distortionless translating device 12. It is contemplated that the record is to be made by the deflections of the beam and not by variations in its light intensity, and therefore the recorded variations are not dependent upon the characteristic of the photographic emulsion. The photographic strip is unwound from a reel 24 past the slit 22 onto another reel 25 where it is stored until its development. The width of the slit 22 (see Fig. 2) is small as compared with the variations in the photographic record which are to be recorded and which correspond to the audible frequencies. In other words, the width of the slit is made so narrow that the time required for the given point on the photographic emulsion to pass across the opening of the slit is a small fraction of the time of a cycle of the maximum audible frequency which is to be recorded. The strip 23 with its photographic emulsion may consist of a strip of paper, celluloid, or other suitable material as may be found most convenient.

After being suitably developed the strip 23 carrying the photographic record of sound is utilized for reproduction in the system schematically outlined in Fig. 3. The rays from a source of light 26 preferably similar to the source 19 are concentrated by a lens system into a parallel beam 27 which passes through a narrow slit 28 and through the film 23 onto the sensitive cathode of a photoelectric cell 29. The light passing through the strip 23 to the photo-electric cell varies in accordance with the width of the transparent portion of the strip 23 which in turn varies in accordance with the sound waves which have been recorded. The photo-electric cell is constructed so that the electric current which it delivers is proportional to the variations in light intensity received by it. This is not a difficult matter and is a thing well known to physicists as described by Allen, Photo-electricity, page 111, where it is stated "The number of electrons emitted is directly proportional to the intensity of the acting light. This fact, which is of fundamental importance in connection with the theory of photo-electric action, has been verified over a wide range". The electric variations produced by the photo-electric cell are of small magnitude and unsuitable for use with any telephone receiver which is required to reproduce a substantial volume of sound. For audible reception they may be amplified, as for example, by a distortionless amplifier of the vacuum tube type conventionally indicated by a single vacuum tube 30 and its associated batteries and input and output circuits. In practice, there will be used a multi-stage amplifier for amplifying the weak currents feeding into another single or multi-stage distortionless amplifier in the manner described on pages 10 and 11 of Bulletin T—672 above referred to. Thus there will be arranged any suitable number of stages of amplification necessary to amplify the weak currents produced by the photo-electric device 29 up to the necessary power and voltage.

The amplified energy is used to reproduce the recorded sounds by means of a distortionless telephone receiver which operates in accordance with what is believed to be a new principle. Audible sound in atmospheric air may be looked upon as a particular mode or form of heat energy which is varying in accordance with the sound. The condensations may be looked upon as restricted regions within which the heat energy per unit volume is greater than the heat energy in the rarefactions. Thus by increasing and diminishing the heat energy in an appropriate manner in a space in atmospheric air one may produce expanding wave fronts of condensations and rarefactions which constitute audible sound. In order to vary the heat energy of a volume of atmosphere in synchronism and in accordance with the variations of the audible sounds, use is made of the arrangements now to be described.

A filament 31 is heated by a battery 32 or other suitable means and caused to become electronically active. Adjacent to and opposite the filament is an anode 33 having an external circuit connection to the filament through a battery 34 having a suitable terminal electromotive force. An electromagnet 35 of suitable field strength is located with its poles longitudinally arranged with respect to the axis connecting the filament 31 and the anode 33. The amplified electrical waves representing the sound to be reproduced are impressed upon the electrostatic electrodes 36 which are connected to the terminals of the secondary winding of the transformer 37 which is connected to the output circuit of the amplifier 30.

In the arrangement of Fig. 4 the electrical waves representing the sound to be reproduced are impressed in series upon the circuit connecting the electronically active filament 31 and the anode 33. The battery 34 is placed in series with a regulating resistance 37. Microphone 38 and amplifier 39 conventionally indicate any source of electrical waves of suitable energy which are to be translated into sound waves.

The arrangement of Fig. 5 differs from Fig. 4 in that the anode 33 is in the form of a hemispherical wire basket through the openings in which the sound radiation takes place from within the space bounded by the anode 33 and the hard deflecting walls 40 of insulating material which partially surround this space in the form of a cone. This is for the purpose of obtaining a substantially hemispherical wave front sound emission.

In the arrangement of Fig. 6 the filament 31 and the anode 33 are arranged in a manner similar to that of Fig. 3. However, one of the speech input electrodes corresponding to the electrodes 36 of Fig. 3 is arranged in a central position as indicated at 41 and has an insulated lead-in connection 42. The other electrode is in the form of a hollow spherical conducting cage 43 which has the remaining electrodes contained within itself and has the electrode 41 at the geometrical center. The purpose of this arrangement is to attain an approximately spherical emission of sound energy.

In Fig. 7 several electron emitting filaments 31 arranged in the form of a frustum of a cone, are associated with the anode 33. The speech input electromotive force is applied to the electrodes 41 and 43, the latter of which is in the form of a hemispherical metal cage or basket similar in form to the anode of Fig. 5 and is associated with a hard sound reflecting cone 40 as in Fig. 5. The filaments 31 are preferably mounted on the cone 40.

In Fig. 8 the input circuit for the wave energy which represents the sound to be reproduced is directly in series in the cathode-anode circuit 31, 34, 33 as in the case of Fig. 4, but a transverse magnetic field is superimposed upon the region which the ions traverse in traveling from the cathode 31 to the anode 33. This magnetic field is provided with a suitably energized electromagnet 35.

In Fig. 9 the input circuit for the waves representing the sounds to be reproduced is superimposed upon the unidirectional current circuit of the electromagnet 35. In this case the transformer 44 is the input transformer. A constant transverse electromagnetic field is thus provided upon which is superimposed electromagnetic variations resulting from the energy of the waves of audible frequency to be reproduced.

Fig. 10 differs from Fig. 8 in that a longitudinal magnetic field is produced by the electromagnet 35, that is to say, the magnetic lines of force are in general parallel to the paths taken by ions traveling between the cathode 31 and the anode 33.

A somewhat different arrangement is presented in Fig. 11. In this case speech input energy from a sound reproducer such as disclosed in Fig. 3 or a microphone circuit with or without an amplifier, as disclosed in Fig. 4, is impressed through the input circuit 45 upon a high frequency wave generating and modulating system. The wave generating and modulating system consists of a thermionic vacuum tube or system of tubes 46 having an input circuit 47 to which the wave representing the sound energy is supplied. A tube or system of tubes 48 is associated with a suitable tuned circuit consisting of reactance elements 49, 50 and 51 so related to the input and output circuits of the tube 48 as to constitute an oscillation generator of waves of a high frequency determined by the tuning of the circuit 49, 50, 51. A grid stopping condenser 52, a high resistance grid leak 53, a choke coil 54 of high impedance to high frequency currents and low impedance to low frequency currents such as those which represent speech, a battery 55 and a choke coil 56 having a high inductance at speech frequencies serve to complete the modulating and generating system. This circuit as described is a well known form of circuit for modulating high frequency waves in accordance with low frequency waves.

The high frequency waves generated by the generator tube 48 are impressed upon a coil 57 which has one terminal preferably grounded and another terminal connected to a metallic plate 58. The coil 57 is adjusted so that its natural period corresponds to the periodicity of the oscillations produced by the oscillation generator, that is, it is a self-resonating coil. When the generator is operated the resonance effects in the coil 57 will cause the setting up therein of high frequency oscillations in such a manner that the terminals of the coil will be at extremely high potentials with respect to each other. The plate 58 may have mounted thereon a number of sharp pointed projections 59, or a single sharp pointed projection 59 as shown in Fig. 11ª or it may be a plain flat surface as shown in Fig. 11ᵇ. When the generator is operating a metal screen 60 which may be in the form of an ordinary window screen is placed adjacent the points 59 or to the plate 58. A condition of ionic activity is manifested between the points 59 and the screen 60. This discharge may assume the form of a bluish discharge near the points 59. In general there will be no visible phenomena adjacent the screen 60 such as are present in the case of an arc or discharge between two adjacent electrodes. The air between plate 58 or points 59 and screen 60 is highly ionized. When speech or other sound waves are applied to the input circuit 45 the oscillations generated by the vacuum tube generator are modulated in accordance with those sound waves and sound waves of considerable energy originate in the space between the plate 58 and the screen 60 and are impressed upon the surrounding atmosphere. In practice, it has been found possible thus to produce sounds which are plainly audible at a distance of several meters in a room filled with disturbing sounds caused by the running of heavy machinery. In thus operating, vacuum tubes 46 and 48 of relatively small power capacities were employed and the speech input was supplied from an ordinary microphone and a vacuum tube amplifier consisting of one small tube.

Fig. 12 illustrates an arrangement for enclosing the electron emitting filament, and its associated anode if desired, in a plastic wall membrane within which is contained inert gases such as nitrogen, hydrogen, argon or a suitable mixture of these or other gases. It is particularly desirable to exclude gases which exercise a so-called "poisoning" action upon certain commonly used forms of thermionic electron emitters such as platinum, tungsten or alkaline-earth oxide-coated platinum wires. Furthermore, as has been published by Mr. O. W. Richardson and others the presence of gaseous hydrogen, even in minute quantities, greatly increases the thermionic emission from such electron emitters. In Fig. 12 the cathode 31 and the anode 33 are surrounded by a thin rubber membrane 61 resembling a toy balloon or some other equivalent air-tight membrane. The inert gases may be supplied through an input pipe 62 and led off through an output pipe 63, each of which may be provided with suitable stop cocks or other means for regulating the flow. In particular it is contemplated to supply gaseous hydrogen and some other inert gas such as nitrogen. This mixture may be very conveniently produced by supplying to the space surrounding the electrodes gaseous ammonia, which upon being disassociated by the electric discharge will break down into gaseous hydrogen and gaseous nitrogen. Consequently, there results increased emission of negative electrons from the electron emitter and an elimination of the so-called "poisoning" action of gaseous oxygen. This arrangement for surrounding an electron emitter with some inert or other gas or mixture of gases and excluding ordinary atmosphere is applicable to arrangements such as Figs. 3, 5, 6, 7, 8, 9 and 10 and other modifications not illustrated as well as to Fig. 12. The electrode arrangement and input supply of Fig. 12 is generally similar to that of Fig. 4. In Fig. 13 the electrodes are arranged as shown in Figs. 3 and 6 and are surrounded by a thin rubber membrane 61 which may be filled with atmosphere or an inert gas as in the modification shown in Fig. 12.

Reference will now be made to the operation of the sound reproducer of Fig. 3. It is contemplated that the region between and surrounding the electrodes 31 and 33 shall consist of ionized air, but this ionized space will not have such a high degree of ionization that it possesses the appearance and characteristics which are recognized as characteristic of a voltaic arc. On the contrary it is contemplated that this space shall have within it ionized carriers which are fewer per unit volume within this space than the density of such carriers within the ionized stream of a so-called voltaic arc. It is proposed to use ionized spaces in open atmospheric air and operate upon them electrically so as to be able to transfer energy to the non-ionized atmospheric air in the vicinity without the agency of a diaphragm of solid material possessing mechanical mass of any appreciable amount. In order to transfer energy directly to the atmospheric air it is contemplated to influence the charged electrical carriers thus produced in an ionized space and have these small particles, ionized molecules or ions, or charged molecular aggregates as the means for electrically transferring energy in the form of heat or sound vibrations directly to the molecules in the non-ionized atmospheric air by causing these ionized particles to collide with the non-ionized molecules of air. The ionized spaces which are used may be ionized not only by the means herein described but by the use of such known methods as flames burning in open air, intense beams of X-rays through a space in atmospheric air, by the transmission of radiations from a radio-active substance through a space in atmospheric air or by the transmission of ultra-violet or other kinds of light through a space in atmospheric air or by the use of incandescent electron emitting bodies other than those described. Such electron emitting bodies may be incandescent metals coated with oxides of the alkaline earths or other substances, incandescent oxides of thorium, or other electron emitter.

In such arrangements as Fig. 3 the elements 36 constitute electrostatic electrodes immersed within or adjacent to the ionized space. In either case they are so arranged as to deflect electrostatically the large ions within the space and thus add to the heat energy of the ionized space, which in turn, by being in contact with the non-ionized adjacent air, radiates sound vibrations to and into the adjacent air. In accordance with this method of electrostatic deflection, it is not necessary that the ions of one kind of sign predominate in number over those of the opposite kind of sign, providing the density of the carriers in the ionized space is low enough to permit the electrostatic field from the control electrodes to penetrate appreciably into the ionized space, that is to say, the density of the carriers of one kind of sign must not be great enough to shield the electrostatic controlling field from the carriers of the opposite sign. On the other hand, if the carriers of one sign predominate, it is easily seen that the carriers may be deflected by the electrostatic field between the control electrodes. In Fig. 3 the magnetic field may be transverse as in Fig. 8, if desired.

Although the arrangements of Figs. 4, 5, 8 and 10 primarily involve the idea of the addition of appreciable ionization to the ionized space by means of input electrodes, these structures may be illustrative of a method of electrostatic deflection provided suitable deflecting electrodes are supplied and appreciable conduction does not occur between the input electrodes and furthermore, provided that the bulk of the carriers between the anode and the cathode in each said instance are charged electronic carriers of one kind of sign of molecular magnitude. One method of accomplishing this predominance of charged carriers of one kind of sign of molecular magnitude is to have the electron emitting element 31 not emit negative electrons but instead to make it an emitter of positive ions and to have these positive ions traverse the space between the cathode and the anode, which are maintained at a given potential, such that at no time in their flight across this space will these positively charged carriers of molecular magnitude have acquired a velocity sufficient to ionize the air within the space.

Another method of accomplishing the predominance of charged carriers of one kind of sign of molecular magnitude is to maintain a potential gradient in the space between the negative electron emitter 31 and its cooperating anode so small that the negative electrons do not on the average attain sufficient velocity to ionize the air molecules in the space. The negative electrons then attach themselves to some of the uncharged air molecules and heavy negative ions and molecular aggregates are thus obtained. The density of the charged carriers within the ionized space is not great enough so that the carriers of one kind of sign, either positive or negative, exercise a strong or large shielding action upon the carriers of the other kind of sign. In the case of electric arcs there is an approximately equal number of positive and negative carriers and electrodes immersed within such an ionized arc stream or adjacent to it exercise little influence upon the arc stream when these electrodes are eletrostatically charged because of the shielding action of the carriers of one kind of sign upon the other. That is to say, the electrostatic field from the influencing electrodes does not penetrate well into the ionized space because of the relatively great density of the carriers of both kinds of sign per unit volume for which reason relatively low densities of ionization are made use of in the present instance, as hereinbefore stated. In the arrangement of Fig. 8, the magnetic field is transverse to both the ionized field and the audio frequency currents. The audio frequency variations of the ionizing current bring about audible variations in the non-ionized air in the vicinity of the cathode and the anode. There is thus provided a means of adding heat energy to the space in the vicinity of the electrodes 31 and 33 in synchronism with the audible sounds to be reproduced.

In Fig. 9 the ionization current is transverse to the audio frequency magnetic field. The pulsations of flux across the space between the poles of the magnet causes the sheet of ionized air, which is steadily ionized by a steady direct current, to be moved back and forth and thus vibrate the non-ionized air and emit sound vibrations into it. The sheet of ionized air occupies the bulk of space between the poles of the input magnet which receives the variations of current corresponding to and constituting the undistorted speech waves.

In Fig. 10 the speech current is superimposed upon an ionization current in a longitudinal magnetic field. The motion of the charged carriers in this case will be in the form of helices or spirals around the lines of magnetic flux.

In accordance with the method of Fig. 3 the path of the ionized current between the electron emitter and its opposing anode may be parallel to the lines of magnetic flux supplied by the electromagnet and the alternating current corresponding to the voice variations will traverse the ionized space in the direction of the lines of magnetic flux furnished by the magnet. In this arrangement the charged carriers traversing the space between the negative electron emitter and its cooperating anode will in general execute spirals and helices around and along the lines of magnetic flux. The voice frequency currents traversing this space at right angles to the lines of magnetic flux will, in general, have their conducting particles displaced at right angles to the direction of current flow and also at right angles to the direction of the magnetic flux of the main field, thus producing a maximum mechanical displacement of charged carriers away from the conducting region. Therefore, this arrangement is an advantageous one for the transfer of mechanical motion or heat energy from the charged carriers in the voice frequency circuit to the surrounding atmosphere. From preceding disclosures it is evident that audio frequency energy may be transferred to the non-ionized air if the ionization current is transverse to the magnetic field and the audio frequency current is parallel to the magnetic field.

It is possible, in connection with the preceding arrangements, to make use of either electrostatic or electromagnetic fields which are oblique either with respect to each other or to the ionization path, or both. In this case they will have both a transverse and a longitudinal component.

The ionized stream sound reproducers are reversible in that sound energy entering into, or existing in, the ionized body of atmosphere causes a wave variation of sound frequency in the speech frequency circuit which in any particular instance comprises the input circuit. In other words the device constitutes a microphone and the input circuit becomes the output circuit. The alternate condensation and rarefaction of the atmospheric space occupied by the ionized stream changes the impedance of the circuit corresponding to the input circuit of any of the arrangements hereinbefore illustrated and consequently changes the current flowing in this circuit. It is therefore to be understood that these devices may be used for converting sound energy into electrical energy as well as for converting electrical energy into sound energy.

The disclosures herein are schematic and are not intended to indicate dimensions either electrical or mechanical. The general dimensions will be known to those skilled in the art from a study of experimental data already published in the general literature of ionization and the necessary dimensions for producing the best results in any individual case are necessarily determined by adjusting the apparatus to obtain the maximum results.

Having described various methods, systems, apparatus, and elements cooperating to produce a speech recording and reproducing system, the novel features believed to be inherent in the invention are set forth in the appended claims.

What is claimed is:

1. The method of converting electrical waves into atmospheric waves which comprises ionizing a volume of gas to a degree less than the ionization of a voltaic arc, varying the ionization of the gas in accordance with the electrical waves, and impressing upon the atmosphere wave variations corresponding to the varied condition of ionization thus produced.

2. The method of converting electrical waves into sound which consists in producing an ionized stream in an unevacuated space, and impressing thereon an electrostatic field transverse said stream, and a steady electromagnetic field longitudinal to said stream and varying the electrostatic field in accordance with sound waves.

3. The method of converting electrical waves into sound which consists in producing an ionized stream in an unevacuated space, superimposing thereon a steady magnetic field longitudinal to said stream, and varying the ionized stream at an audible frequency.

4. The method of converting electrical changes into sound which consists in producing an ionized stream in unevacuated space, subjecting said stream to an electrostatic field, and varying said field, in accorance with said electrical changes.

5. The method of producing radiation in a given volume of atmosphere comprising a solid angle of any desired dimensions which comprises ionizing a body of air at the apex of the solid angle, said body having approximately the same angular dimensions as the solid angle.

6. An arrangement for reproducing sound waves which comprises means for establishing an ionic discharge field within a body of gas, means for superimposing upon said field an electromagnetic field, and means for varying one of said fields in accordance with said sound waves.

7. An arrangement for producing sound waves from electrical waves which comprises means for establishing an ionized field in a body of gas, means for superimposing thereon an electromagnetic field, and means for superimposing upon the combined fields an electrostatic field varying in accordance with audible frequencies.

8. In combination, an electron emitting element and a cooperating anode for receiving the electrons emitted, said element and anode being surrounded by a plastic gas tight envelope.

9. In a combination in accordance with claim 8, means for maintaining the envelope filled with inert gas such as nitrogen, hydrogen or argon.

10. In a combination in accordance with claim 8, means for supplying ammonia gas to the space within said envelope.

11. In a combination in accordance with claim 8, an inlet conductor and an outlet conductor for conducting gas into and out of said envelope.

12. In a combination in accordance with claim 8, a circuit passing through said envelope and connecting said emitter and said electrode externally to said envelope.

13. An electron discharge device comprising an electron emitting filament electrically heated by the passage of an electric current, a plastic walled gas tight envelope, and means for maintaining said envelope filled with an inert gas of the class adapted to increase electron emission.

14. An arrangement for producing sound waves corresponding to variations of electrical potential comprising a perforated metal screen adjacent to a conducting body, and means for maintaining a condition of ionization between said screen and said body, said screen and said body being immersed in gas at substantial pressure.

15. A telephonic device comprising a cathode, an anode and means for producing a potential difference between said electrodes, the space between the electrodes being open to the atmosphere, the potential difference being too small to produce substantial ionization of the atmosphere in said space.

In witness whereof, I hereunto subscribe my name this 20th day of September A. D., 1922.

HOMER C. SNOOK.